J. P. CLEMENT.
Cattle Pump.
No. 229,587.  Patented July 6, 1880.
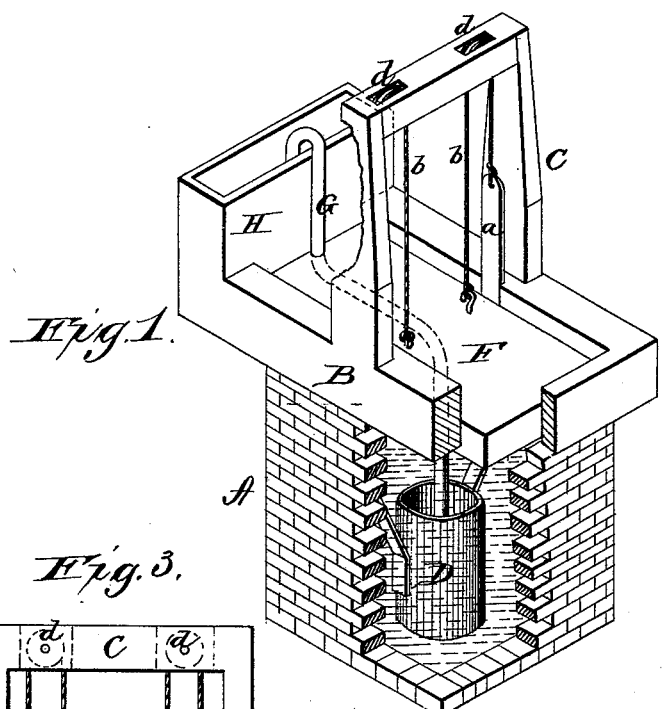
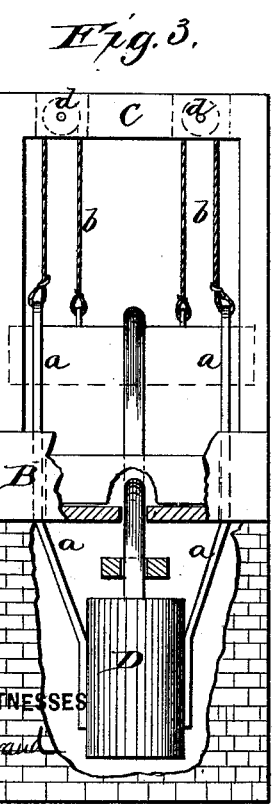
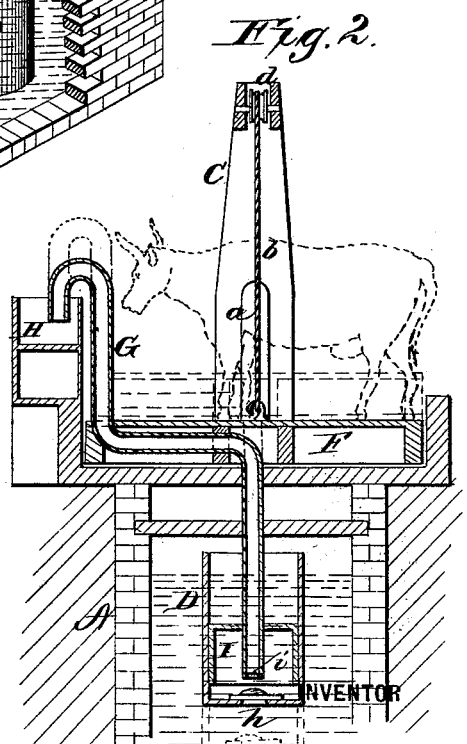

UNITED STATES PATENT OFFICE.

JOHN P. CLEMENT, OF GRINNELL, IOWA.

CATTLE-PUMP.

SPECIFICATION forming part of Letters Patent No. 229,587, dated July 6, 1880.

Application filed November 25, 1879.

*To all whom it may concern:*

Be it known that I, JOHN P. CLEMENT, of Grinnell, in the county of Poweshiek, and in the State of Iowa, have invented certain new and useful Improvements in Cattle-Pumps; and I do hereby declare that the following is a full, clear, and exact description thereof, reference being had to the accompanying drawings, and to the letters of reference marked thereon, making a part of this specification.

The nature of my invention consists in the construction and arrangement of an automatic pump by means of which cattle and horses can pump their own water, as will be hereinafter more fully set forth.

In the annexed drawings, Figure 1 is a perspective view of my pump. Fig. 2 is a vertical section of the same. Fig. 3 is an end view thereof.

A represents the well. B is curbing around the same, with a frame, C, erected thereon. D is the pump-cylinder, attached to two arms, $a\ a$, which extend upward at the sides of the well and are attached to two ropes or chains, $b\ b$. These ropes are passed over pulleys $d\ d$ in the frame C, and are then attached to the platform F, as shown.

The discharge-pipe G is connected to the platform, its upper end being bent to pass over the edge of the trough H, while the lower end passes downward through the cylinder and has the piston or plunger I attached to it. $h$ is valve in cylinder, and $i$ is a check-valve in discharge-pipe.

The piston or plunger has an air-chamber, made by extending the water-pipe down into the cylinder or plunger flush with the rim or lower open end of said plunger. The plunger, it will be noticed, is in the form of an inverted cup. When the cylinder and plunger are submerged under water the compression of the air thereby forces the water up the water-pipe a certain height without requiring any weight of animal upon the platform. The elasticity of the air, when a stroke of the pump is made, helps to force the plunger up on its return stroke, and helps also to force the cylinder down at the same time, by means of which the platform is readjusted and the cylinder loaded or filled, ready for another discharge when an animal shall go on the platform. By means of the cords and pulleys the weight of the animal bears down upon the plunger and pulls up on the cylinder, both at the same time, compressing the water between two moving forces at once.

If the compression of the air is not sufficient to readjust the platform, the cylinder can be weighted upon its arms heavy enough to accomplish the desired result.

Double pulleys may be used, by means of which the lifting power of the pump is doubled, as the distance of the fall of the platform is double that of the rise of the cylinder.

Having thus fully described my invention, what I claim as new, and desire to secure by Letters Patent, is—

1. An automatic cattle-pump having the pump-cylinder and platform suspended from opposite ends of cords or chains which pass over pulleys, and the piston-rod attached to the platform, substantially as herein set forth.

2. The combination of the platform F, water-pipe G, and plunger I with the cylinder D, arms $a$, and cords and pulleys, substantially as and for the purposes herein set forth.

In testimony that I claim the foregoing I have hereunto set my hand this 1st day of November, 1879.

JOHN P. CLEMENT.

Witnesses:
  C. W. H. BEYER,
  JOS. G. PALMER.